United States Patent [19]

Tayler

[11] 4,414,644
[45] Nov. 8, 1983

[54] METHOD AND APPARATUS FOR DISCARDING DATA FROM A BUFFER AFTER READING SUCH DATA

[75] Inventor: Gerald E. Tayler, Tucson, Ariz.

[73] Assignee: International Business Machines Corporation, Armonk, N.Y.

[21] Appl. No.: 251,005

[22] Filed: Apr. 3, 1981

[51] Int. Cl.³ .............................................. G06F 9/30
[52] U.S. Cl. ................................................. 364/900
[58] Field of Search ... 364/200 MS File, 900 MS File

[56] References Cited

U.S. PATENT DOCUMENTS

| 4,197,580 | 4/1980 | Chang et al. | 364/200 |
| 4,322,795 | 3/1982 | Lange et al. | 364/200 |

Primary Examiner—Gareth D. Shaw
Assistant Examiner—Tim A. Wiens
Attorney, Agent, or Firm—H. F. Somermeyer

[57] ABSTRACT

A two-level storage system selectively enables early discard of data from an upper level either immediately or at the end of a predetermined sequence of operation. A copy of data in such upper level is discarded immediately while altered copies of data are discarded at the end of the predetermined sequence of operations. Error conditions inhibit discarding altered data.

13 Claims, 5 Drawing Figures

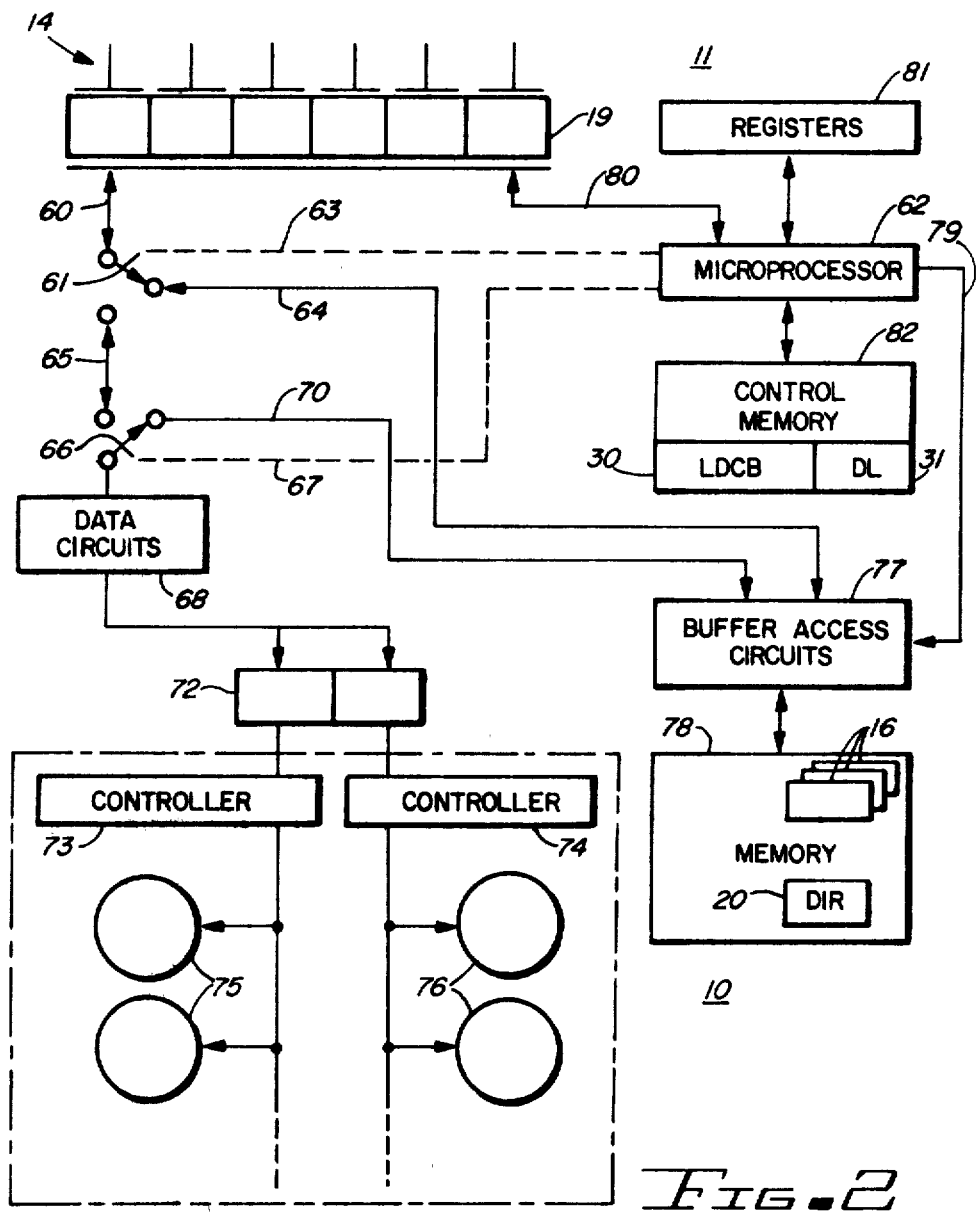
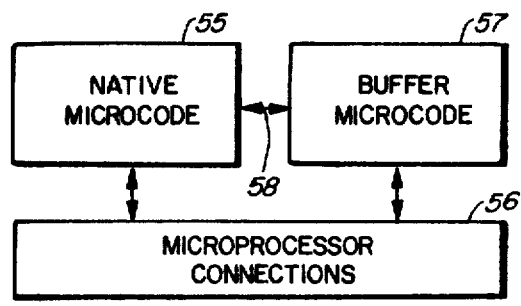
Fig. 2
Fig. 3

METHOD AND APPARATUS FOR DISCARDING DATA FROM A BUFFER AFTER READING SUCH DATA

FIELD OF THE INVENTION

The present invention relates to data processing, particularly, to control of a data buffer memory or cache connected to a backing store.

BACKGROUND OF THE INVENTION

Buffer memories have been used for years for enhancing operation of memory systems. When such a buffer becomes large and is extremely fast, such that the relatively low-performance of a backing store is substantially masked from a using unit, such a buffer has been referred to as a cache. For cost control purposes, it is desired to minimize the size of a buffer memory, particularly when so-called caching characteristics are desired. To date, the contents of a cache are determined by several automatic mechanisms which are usually based upon algorithms of diverse types. A first mechanism is the promotion of data from the backing store to the cache. The purpose of the data promotion is to ensure that the data in the cache is the most likely to be used next by the using unit, such as a central processing unit. With only a data promotion mechanism, the cache would soon fill up, preventing further data from being promoted from the backing store. To ease this problem, replacement algorithms have been designed with mechanisms implementing those algorithms replacing data in the cache with new data being promoted from the backing store. With this combination of data promotion and replacement, the cache is always full of data. Optimizing caching characteristics, i.e., maximizing the so-called device characteristic masking feature of the caching function, requires a relatively large cache. Further, the replacement algorithm may require that data be transferred from the cache to the backing store before new data can be promoted. This action results in a performance degradation. Accordingly, it is desired to provide a caching or buffering function which tends to maximize the caching characteristics with a smaller cache than would be required with the usual data promotion and replacement control mechanisms. Some prior cache mechanisms are next described.

U.S. Pat. No. 4,048,625 shows a first-in, first-out (FIFO) buffer which invalidates data areas upon readout. Data validation in the buffer occurs independently of error conditions. Also, invalidation occurs irrespective of whether data was modified while it was in the buffer.

Lang et al., U.S. Pat. No. 3,845,474 shows invalidating cache data when a first processor reads it when the data is in a so-called "communication table". That is, data accessible by another processor which can change such data independent of the cache-running processor is invalidated.

Chang et al., U.S. Pat. No. 4,197,580 shows a cache having a validity bit for each cache area; upon readout, the validity bit may be reset, i.e., data becomes invalid.

In general, a dual-copy philosphy is used in many cache-backing store situations. That is, a main memory will have one copy, and the cache will have a second copy. Generally, in a processor cache, the data is usually not destroyed as it is read except as set forth in Lang, et al. above.

SUMMARY OF THE INVENTION

According to the invention, a storage system has a backing store and a cache or buffer. The data storage system can receive from a using host a read and discard (RAD) indicator. Means are responsive to the RAD indicator to effectively erase the data in the cache that has been read by a host or other using system. Unless such data has been modified, that is, the data in the cache is different than the data in the backing store, then means are responsive to an end of operation signal (end of a chaining operation, for example) to destage the modified data (in accordance with a least-recently used algorithm or immediately) that was read from the cache by the host to the backing store and then effectively erasing the data from the cache. Erasure of such data from the cache is preferably achieved by destroying the addressability of the data in the cache, i.e., erase a directory entry that directs accesses to the appropriate cache area for the data.

The foregoing and other objects, features, and advantages of the invention will be apparent from the following more particular description of preferred embodiments of the invention, as illustrated in the accompanying drawings.

DESCRIPTION OF THE DRAWINGS

FIG. 2 is a diagrammatic showing of a preferred embodiment of the invention illustrated in FIG. 1 and as it is practiced with a DASD (Direct Access Storage Device) storage system.

FIG. 3 is a diagrammatic showing of interaction on microcode controls usable in the FIG. 2 illustrated embodiment.

DETAILED DESCRIPTION

Figure 1:
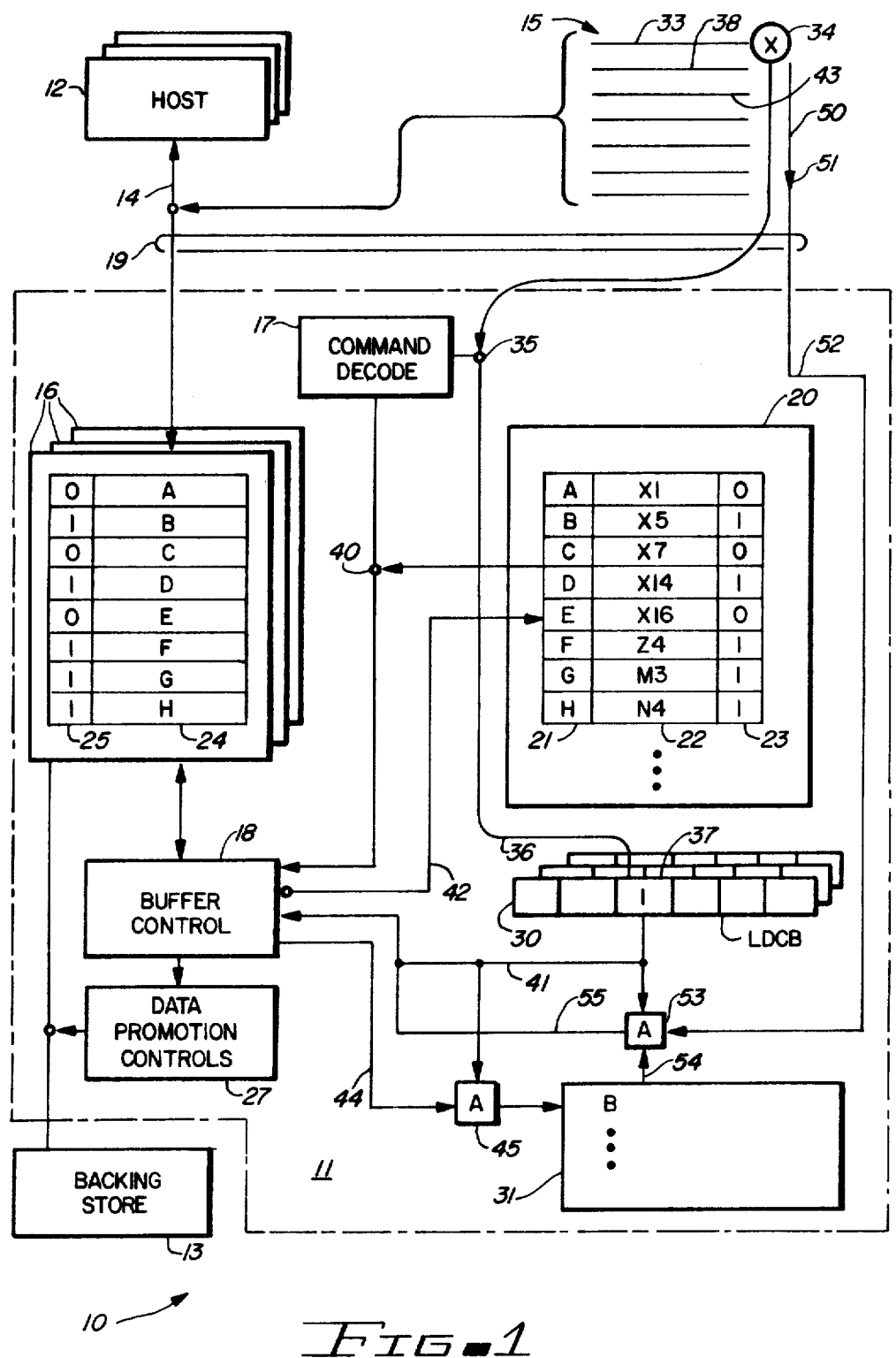
FIG. 1 is a diagrammatic showing of a storage system connected to a host which employs the present invention.

Referring now more particularly to the drawings, like numbers indicate like parts and structural features and functions in the various diagrams. FIG. 1 shows a storage system 10 attached to a plurality of hosts 12, such as central processing units, communication systems, and the like. A storage director 11 within storage system 10 provides for data transfers between the backing store 13 and the host 12 via input/output connection 14. Backing store 13 preferably consists of a plurality of disk-type data storage apparatus as indicated in more detail in FIG. 2. Backing store 13 can also consist of random access memories, so-called bubble memories, magnetic tape recorders, unit record equipment, optical storage devices, and the like. Interconnection 14 is a computer input/output connection such as used on IBM computers. A description of such interconnection is found in publication no. GA22-6974-4 entitled, "IBM System/360 and System/370 I/O Interface Channel to Control Unit Original Equipment Manufacturer's Information" (OEMI) available from International Business Machines Corporation, Data Processing Division, 1133 Westchester Avenue, White Plains, N.Y., 10604. This interface is widely used in the data processing art and is well-known.

Each host 12 operating with storage system 10, when using the above-described interconnection, provides for chains of peripheral operations which constitute a single sequence of operations. FIG. 1 illustrates a chain of operations 15 consisting of a plurality of peripheral commands represented respectively by the plurality of horizontal lines. Each sequence of operations preferably operates with a buffer within storage director 11 represented in FIG. 1 by a plurality of allocated buffer segments 16. Storage director 11 responds to the chain 15 peripheral commands through its command decode 17 which then activates a buffer control 18 for transferring data signals between a host 12 and a buffer allocated segment 16, as well as between backing store 13 and such allocated buffer segment 16. A channel adaptor 19 intercepts the commands from host 12 and supplies them to command decode 17. Data signals are transferred directly to buffer segment 16, as will become apparent and as widely practiced in the data processing art.

Each of the allocated buffer segments 16 are addressible registers (not shown) within predetermined address ranges of a relatively large buffer, such as a memory in the megabyte capacity range. To effectively access buffer segments 16, a directory 20 is maintained within storage director 11 for pointing to the areas within allocated buffer segment 16 that contain data signals corresponding to what is termed a "logical device". Each segment can contain data relating to one logical device. That is, each host 12 can access storage system 10 through certain address codes. Each address code corresponds to a so-called logical device. The rest of the desciption of this specification assumes that one logical device has been indicated by a host 12; it is understood that a plurality of logical devices can be identified in an interleaved manner by host 12 such that highly multiplexed data processing operations can occur between hosts 12 and storage system 10.

Returning now to directory 20, a column of entries 21 contain the identification of the blocks of data signals, preferably blocks of fixed size, that are stored in buffer segments 16. For purposes of simplicity, these are labeled A through H for the logical device being discussed. Within each directory 20 register is an address in column 22 which identifies the area of buffer segment 16 where the corresponding data is stored. In a preferred embodiment, each identified area has a fixed number of addressible storage registers, such as capable of storing 500 bytes, 1 kilobyte (KB), 2 KB, 4 KB, etc. For example, data block A is stored at address X1, data block B at address X5, and so forth. A third column 23 contains a single bit position for each of the data blocks identified in the directory for indicating whether or not an access to the buffer segment 16 resulted in a change in the indicated data block. For example, directory 20 shows that data block A has not been changed, i.e., the image of data stored in buffer segment 16 is identical to the same block of data stored in backing store 13. On the other hand, data block B is indicated as having changed data, i.e., a binary 1 occurs in column 23 indicating that a host 12 accessed allocated buffer segment 16 and altered the data block B from that data that was promoted from backing store 13. This means that the image of data block B in the allocated buffer segment 16 is different than the block B stored in backing store 13.

Data blocks A through H can be a sequence of data blocks that are logically contiguous. Storage of such sequential contiguous data blocks within an allocated buffer segment 16 can be fragmented as indicated by the addresses in column 22. The data blocks A through H are shown as being stored at 24 in a first-allocated buffer segment 16. It is to be understood that the indicated segment 16 is a logical segment and physically may be distributed throughout the actual memory for performance, integrity, and other purposes, as is known in the data memory management art. Associated with each block of data 24 can be a bit indicated in column 25 corresponding to the bits in column 23, i.e., whether or not the data is actually altered. In a preferred form of the invention, only column 23 occurs. Other control features in directly 20 and within allocated buffer segment 16 may be provided which are not pertinent to an understanding of the present invention.

This description assumes that the data blocks A through H are already resident in allocated buffer segment 16. This means a prior chain of commands (not shown) indicated to storage system 10 that there was a likelihood that the data blocks A through H of backing store 13 would likely to be used in the immediate or near future. Accordingly, data promotion controls 27, which can be of a known type, cause the storage director 11 to access backing store 13 for the purpose of transferring data signals from the backing store 13 to allocated buffer segment 16. Such data promotion controls are not pertinent to an understanding of the present invention and, hence, will not be further described. It should be noted that there is co-action between the buffer control 18 and data promotion controls 27, as is known in the caching art.

For practicing the present invention, some additional controls are added to storage director 11. Since storage system 10 is addressed through logical devices, a logical device control block (LDCB) is provided for each logical device. A set of registers 30 contain the signals of the LDCB. LDCB contains all of the control information necessary for storage system 10 to operate with the logical devices in responding to hosts 12 requests. Note that the logical device can be compared to an access path from host 12 to backing store 13 as modified by the caching function of buffer segment 16. Bit position 37, the RAD bit, is an important aspect of LDCB for practicing the present invention. Bit 37, when set to the active condition for a logical device, signals the storage director 11 to discard data from cache that was read to host 12 as quickly as possible. A second control in storage director 11 is discard list 31 which is an addressible set of registers containing an indentification of those data blocks in allocated buffer segments 16 which are to be discarded at the end of the present sequences of operation, i.e., at end of chaining when using the above-described interconnection 14. As an alternative, the modified data indicated in block 31 can be destaged to the backing store upon completion of the sequence of operations (at the end of chaining). There is one list in item 31 for each logical device.

A first command within chain 15 can be a mode set command. Such a mode set command 33 can contain a "RAD" bit position 34 indicating read and discard. When bit 34 is set to the active condition in a given mode set command directed toward a given logical device, command decode 17 responds as indicated at 35 to transfer the bit 34 to bit position 37 within LDCB 30 for the given logical device. If there are a plurality of logical devices, then there are a plurality of registers 30 and a corresponding plurality of RAD bits 37. The transfer of RAD bits from a peripheral command by a storage director to a designated register is well-known in the art and not detailed further for that reason. The transfer is indicated in FIG. 1 by line 36.

Following a successfully executed mode set peripheral command, subsequent commands within a chain 15 may cause the transfer of data signals from the allocated buffer segment 16 to host 12. In this instance, command decode 17 responds to a peripheral read command 38 for the given logical device to access directory 20 for identifying the location of the data in allocated buffer segment 16, all as indicated by numeral 40. For example, when data block B is to be read, then address X5 is transferred to buffer control 18 as indicated by numeral 40. Similarly, when data block C is addressed, then address X7 is transferred to buffer control 18 for accessing the data. Once the allocated buffer segments 16 are accessed, data transfer to host 12 occurs. Upon the completion of each read peripheral command, which accounts for transfer of a single block of data, the contents of RAD bit 37 is transferred to buffer control 18, as indicated by line 41. When a data block, such as data block C which was not modified, is transferred to host 12, then buffer control 18 immediately deletes entry C from directly 20 as indicated by line 42. This action destroys the addressability of data block C contained in allocated buffer segment 16, thereby freeing the address X7 for reallocation. On the other hand, peripheral command 43 causes director 11 to transfer data block B contained in allocated storage segment 16 at address X5. Since RAD 37 is set to the active condition and data block B has been altered by a previous sequence of operations (not shown), then buffer control 18 supplies a signal over line 44 to logic AND circuits 45 to transfer the identification of data block B to discard list 31 for the addressed logical device. AND circuits 45 are enabled by the signal on line 41 representing the contents of bit 37, while buffer control 18 transfers the signal designation of data block B to list 31. A list 31 is accumulated for each logical device during each chain 15 to be used as next described.

Chaining is indicated in the interconnection 14 by a so-called SUPPRESS OUT signal being supplied by the host 12 to storage director 11 at ending status time. In FIG. 1, this is indicated by arrow 50 which continues through the various peripheral commands of chain 15 until 51 whereupon SUPPRESS OUT is not supplied when ending status is required for indicating the end of the chain. This condition is detected by the channel adaptor 19 using known circuits. An electrical indication of end of chain is supplied over line 52 to activate logic AND circuits 53 which are also co-activated by RAD bit 37 to pass the list of data blocks to be discarded for the addressed logical device from list 31 as received over line 54. The data blocks being discarded are identified to buffer control 18 over lines 55. The readout of the list 31 is under a sequence control within buffer control 18 (not shown in FIG. 1). Discarding of the modified blocks at the end of the chain is achieved by erasing the entries in directory 20, such as erasing data block B entry.

It may be desired that the modified block be destaged or transferred to backing store 13. Destaging is preferably in accordance with a least-recently used algorithm (LRU). In this instance before the directory 20 entries corresponding to the discard list indicated data blocks are erased, the data is transferred asynchronously from allocated buffer segment 16 to backing store 13.

FIG. 2 illustrates a version of the FIG. 1 storage system that is a preferred embodiment of the invention. Channel adaptor 19 consists of a plurality of individual channel adaptors which respectively receive access requests from hosts 12, one channel adaptor per set of logical devices. No limitation thereto is intended. Data transfers between backing store 13 and host 12 proceed through the channel adaptors 19 as next described. A bus 60 extends from channel adaptors 19 to multiple double-throw electronic switch 61 which selectively makes bus connections directly to backing store 13 or to a cache or buffer memory within storage director 11 via bus 64. A microprocessor 62 controls switch 61 as indicated by dash line 63. For transfer of data signals directly between backing store 13 and channel adaptors 19, bus 65 extends from electronic switch 61 to a second multiple double-throw electronic switch 66 which is also controlled by microprocessor 62 as indicated by dashed line 67. Switch 66 connects bus 65 to data circuits 68 which in turn are connected to backing store 13 via one or more device adaptors 72. The data circuits 68 and device adaptors 72 can be those circuits used in the IBM 3830 storage control unit or the IBM 3880 storage director. From the above, it is seen that host 12 can access data directly from backing store 13 or via the above-described allocated buffer segments 16.

The preferred embodiment of the backing store 13 is a plurality of direct access storage devices (disk-type storage apparatus) 75 and 76 respectively accessible through storage director 11 via a pair of controllers 73 and 74. Such controllers and direct access storage devices can be similar to the IBM 3350 disk storage apparatus or other disk storage apparatus.

Switches 61 and 66 are connected to a memory 78 via buses 64 and 70, respectively, through buffer access circuits 77. Buffer access circuits 77 are those circuits usually employed for accessing a random access memory of the semiconductor type. Memory 78 contains the allocated buffer segments 16, which form a cache, as well as directory 20. Memory 78 is preferably of the semiconductor type having a storage capacity in the megabyte range. Microprocessor 62 controls buffer access circuits 77 by supplying address signals over an address bus 79. Microprocessor 62 also has a plurality of addressible registers 81 for storing control signals as is common practice in the microprocessor art. Further, control memory 82, another semiconductive type of random access memory, contains microcode control programs which determine the logic of operations of storage director 11. That is, the microcode or microprogram within control memory 82 constitutes a logic module defining the electronic operations of the director. Additionally, control memory 82 contains control tables used by the microcode in microprograms, such as LDCB 30 and discard list DL 31. Alternatively, registers 81 could contain LDCB 30 and DL 31. The operation of the invention within the FIG. 2 illustrated embodiment is best understood by referring to FIGS. 3 through 5.

FIG. 3 shows the broad operational relationships between two major sections of microcode stored in control memory 82. Native microcode 55 is that microcode found in the above-referred-to IBM 3830 or 3880 storage control devices. That is, this microcode enables direct transfer of data between channel adaptors 19 and devices 75, 76 which are shown as direct access storage devices. Included in this microcode is the microcode logic for decoding commands as indicated by a numeral 17 in FIG. 1. The arrangement is such that the native microcode 55 will refer received commands to buffer microcode 57 for determining whether or not memory 78 and its associated allocated buffer segment 16 are to be used in a given data transfer command, i.e., a read command which transfers data from backing store 13 to hosts 12 or a write command which transfers data from hosts 12 to backing store 13. Communication between the two sets of microcode logic modules is indicated by double-headed arrow 58. Such linkage can be any known microcode linkage as is widely practiced in the microcode art. Microcode can be in the form of firmware or can be loadable code signals from a tape or disk record. Microprocessor 62 communicates with all elements of the storage director 11 as indicated by the microprocessor connection 56 of FIG. 3. Connections 56 consist of input and output registers (not shown) of microprocessor 62 as is widely used for that type of computer device.

In the preferred mode of operation all of the peripheral commands used with the IBM 3830 and IBM 3880 are decodable by the native microcode 55. The buffer microcode 57 includes that microcode for controlling buffer access circuits 77, i.e., directory look-up and the like. Since such microcode logic is well-known, i.e., programmed access control of memories is well-known, this aspect of the buffer microcode 57 is not described.

Figure 4:
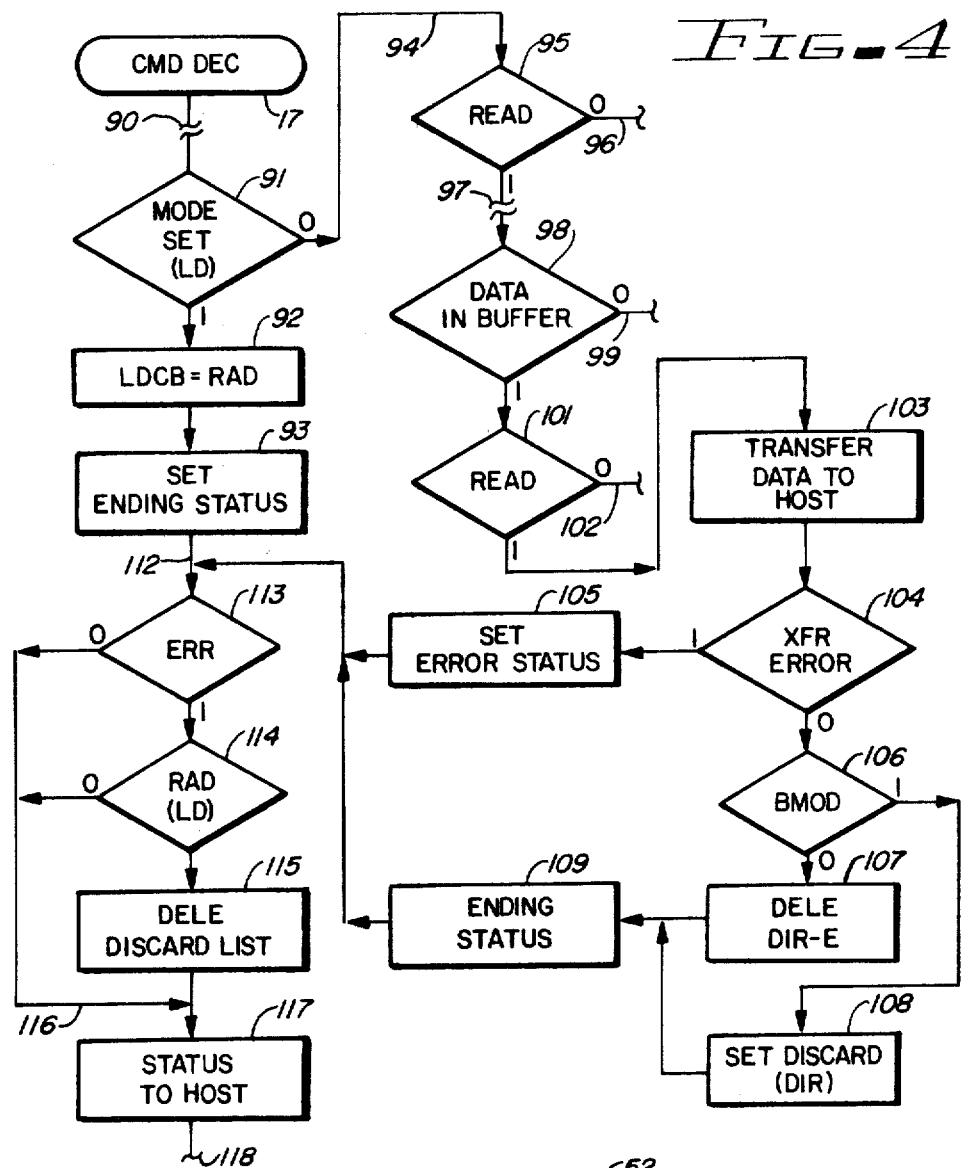
FIG. 4 is a flow chart showing the operations of the FIG. 2 embodiment as performed by the microcode of FIG. 3 in practicing certain aspects of the invention.

FIG. 4 illustrates the response of buffer microcode 57 logic to a decoded commands relating to mode set and read. The command is decoded at 17. Some non-pertinent functions are performed at 90 relating to analysis of the decoded command. Included in the analysis of the decoded command referred to the buffer microcode 57 by the native microcode 55 includes decoding a mode set command for the addressed logical device is analyzed at 91. If a mode set command has been received from host 12, then at 92 LDCB 30 bit 37 is made equal to the RAD bit 34 of that mode set command. For purposes of discussion, assume that the RAD bit 34 is set to unity. Since mode setting provides but a set-up of control indicia within storage director 11, ending status is set as usual at 93. Some later described ending functions are performed for presenting status to the host.

If at 91 the received command is not a mode set command, then path 94 is followed to step 95 wherein whether or not the command is a read command is examined. If it is not a read command, then the procedures of the present invention are not invoked and microprocessor 62 follows path 96 to other microcode logic steps not pertinent or an understanding of the invention. For a read command, some non-pertinent steps are performed at 97 for initializing storage director 11 for the read command use of memory 78. At 98 microprocessor 62 determines whether or not the requested data block is stored in an allocated buffer segment 16. This action is achieved by scanning directory 20 to see if there is an entry in directory 20 identifiable with the requested data block identified in the received read command. If the data is not in the memory 78, then the data must be promoted from backing store 13 to the memory 78 requiring action indicated in FIG. 1 by the data promotion controls and as indicated in FIG. 4 by line 99. If the requested data block is residing in memory 78, then at step 101 microprocessor 62 again examines to see if the received peripheral command is a read command. If not, path 102 is followed for other actions not described. For a read command, at step 103 microprocessor 62 sets switch 61 to the illustrated position of FIG. 2 for transferring data signals from memory 78 through a channel adaptor 19 to host 12. This transfer occurs automatically using automatic data transfer techniques. The address of memory 78 containing the requested data block is first fetched from directory 20 and transferred over address bus 79 to buffer access circuit 77 which includes automatic data transfer capability. Upon completion of the data transfer to host 12, microprocessor 62 examines the automatic data transfer circuit (not shown) within buffer access circuit 77 to see if an error occurred in the transfer. If an error had occurred at step 104, then error status is set at step 105 in a register 81 for reporting to host 12, as later described. When no error occurs, at step 106 microprocessor 62 examines directory 20 to see if the block contained in the buffer has been modified (BMOD). If there is no modification, i.e., column 23 indicates 0 for the requested data block, then at step 107 the entry in directory 20 is deleted as indicated by DELE DIR-E. If there was a modification, such as indicated for block B of FIG. 1, then microprocessor 62 accesses DL 31 and adds the block identification to the discard list in DL 31 for the addressed logical device. Then ending status for the read command is set at 109.

Housekeeping functions following the execution of the above-described command begin at 112. First, at 113 error status is checked. If an error was reported at 105, then at 114 RAD bit 37 of the logical device that was addressed in the read command is examined. If the read and discard bit is active, then the discard list in DL 31 is erased at 115 such that the data in the allocated buffer segment 16 that was unsuccessfully transferred to host 12 is not deleted or made unaddressible. Otherwise, no such action is taken as indicated by line 116. Ending status is supplied to host 12 at step 117 following the procedures set forth in the OEMI manual for interconnection 14 mentioned above. Then microprocessor 16 proceeds to other microcode logic modules as indicated at 118.

Figure 5:
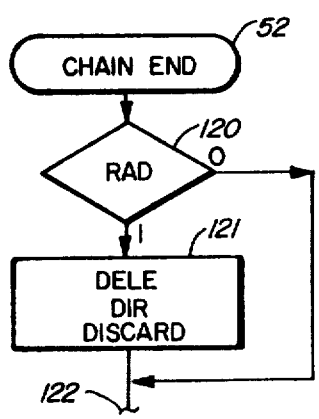
FIG. 5 is a flow chart similar to the FIG. 4 flow chart showing other aspects of the present invention as practiced in the FIG. 2 illustrated embodiment.

FIG. 5 shows the operations of the microprocessor 62 upon detecting the end of a chain at 52. First at 120 RAD bit 37 of LDCB 30 is examined. If it is a 0, then no action need be taken with respect to practicing the present invention. Accordingly, non-pertinent code is executed at 122. On the other hand, if RAD 37 is set to unity for the addressed logical device, then at 121 DL 31 is accessed to identify those entries in directory 20 that have to be deleted. Then microprocessor deletes those entries making the corresponding data unaddressible. As mentioned earlier, when data in a cache is modified by a host 12 it may be desired to update the backing store 13 to reflect those changes. In this instance, prior to deletion of the directory 20 entries, the data blocks identified in DL 31 are first transferred from allocated buffer segment 16 to backing store 13 in accordance with an LRU algorithm. In either event, the modified data contained in allocated buffer segment 16 is effectively deleted or erased from the allocated buffer segment by destroying the addressability to that data by erasure of the directory 20 entry.

From all of the above it is seen that the integrity of data in a buffer is maintained while data is rapidly discarded from the buffer for making prespace within the buffer for promotion of data. This action eliminates the destate or demotion requirements usually imposed upon buffer systems by known replacement algorithms. Accordingly, the early deletion of data based upon an intent signal supplied by host 12 that the data can be discarded whether altered or not provides for reducing the required size of allocated buffer segment 16 for achieving caching properties by the buffer.

While the invention has been particularly shown and described with reference to preferred embodiments thereof, it will be understood by those skilled in the art that various changes in form and details may be made therein without departing from the spirit and scope of the invention:

What is claimed is:

1. A data store system having a backing store and a cache, first means for transferring data between said cache and said backing store, second means for transferring predetermined data between said data store system and a host, chain means for indicating an end of chained sequences of operations in said data store system, the improvement comprising:
first means coupled to said second transferring means for receiving from a host and storing a given indication that predetermined data transferred to a host from said cache can be quickly discarded, and that other data stored in the cache and transferred to a host is not to be quickly discarded,
second means coupled to said cache for indicating data stored in said cache as being different from corresponding and supposedly identical data stored in said backing store,
third means coupled to said second transferring means for being responsive to first predetermined data being transferred from said cache to said host for effectively erasing the first predetermined data from said cache, and
fourth means coupled to said second transferring means and to said chain means for being responsive to second predetermined data being transferred from said cache to said host during a given chained sequence of operations and to said indication of said end of chained sequences for effectively erasing said second predetermined data from said cache.

2. The system set forth in claim 1 further including in combination:
sixth means for listing all of said second predetermined data and being connected to said fourth means for identifying said second predetermined data.

3. The system set forth in claim 2 wherein said data store system is peripheral to the host and said backing store includes a plurality of addressable disk-type data storage apparatus.

4. The system set forth in claims 1 or 3 further including a single electronic bus connecting said cache to said first and second transferring means, switching means for selectively activating either said first or second transferring means to transfer data over said single electronic bus.

5. The system set forth in claims 1 or 3 further including a microprocessor having a control memory with a plurality of addressable control registers and containing microcode logic for operating said system, said microprocessor being connected to all of said means and for controlling same in accordance with said microcode logic, said first means for receiving being predetermined ones of said addressable control registers and said microcode logic for selectively logically coupling said first means for receiving to others of said means.

6. The system set forth in claim 5 further including a random access memory having a multiplicity of addressable storage registers, said cache being a first predetermined set of said addressable storage registers,
a second predetermined set of said storage registers for containing a directory for said cache, said directory consisting of a plurality of data block identification cache address indications and said second means, and
said microprocessor capable of accessing said directory to access said cache.

7. The system set forth in claims 1 or 3 further including error means coupled to said cache and to said second transferring means for indicating an error related to said second predetermined data and seventh means coupled to said error means and to said fourth means and being responsive to said error indication to inhibit said fourth means response to said end of chained sequences indication whereby data stored in said cache is not stored in said backing store.

8. The machine-implemented method of operating a cache connected to a backing store and containing blocks of data corresponding to data stored in blocks in said backing store,
including the automatic machine executed steps of:
identifying a first and second set of data blocks in said cache respectively as being identical to and modified from corresponding blocks of data in said backing store,
transferring predetermined ones of said blocks of data from said cache to a unit other than said backing store in a sequence of block transfers,
effectively erasing from said cache any of said predetermined ones of said blocks of data which are in said first set immediately upon said transfer, and
effectively erasing from said cache any of said predetermined ones of said blocks of data which are in said second set immediately after completion of said sequence of block transfers.

9. The machine-implemented method set forth in claim 8 further including,
receiving a read and discard signal for certain ones of said blocks of data stored in said cache, and
effectively erasing only those predetermined ones of blocks of data which are also said certain ones of blocks of data and maintaining all of said predetermined ones of blocks of data in said cache other than said certain ones.

10. Data processing apparatus adapted to be connected to a digital processor and having a storage controller, a cache and a backing store, the cache being controlled by said storage controller which maintains addressability of data stored within the cache by pages of such stored data, a directory account of the pages stored within the cache that have been changed (page change account) and has a given page replacement protocol for controlling the transferring of data between the cache and backing store,
characterized in that:
said controller having first means for being responsive to a specific processor command to observe a second different replacement protocol from said given replacement protocol;
said controller having second means for being responsive to read-and-discard command (RAD) signals received from a connected digital processor for indicating that said digital processor has completed reading of a specific page of data stored in the cache;

said controller having third means for being responsive to said page change account and said received RAD signals only when operating in response to said specific processor command to effectively delete read but unchanged pages of data from said cache and to retain changed pages of data in said cache; and said controller having fourth means for being responsive to a termination of the said specific processor command to store said retained pages of data in said backing store.

11. Data processing apparatus as claimed in claim 10 in which said storage controller is arranged to respond to said specific processor command as the first command of a chain of commands only for the duration of such chain.

12. Data processing apparatus as claimed in claims 10 or 11 wherein said storage controller for maintaining addressability of data stored in said cache has a directory, in which directory, changed status of said stored pages of data are stored and, in addition, having a logical device control block for each logical device of said backing store and having a discard list of temporarily retained but changed pages of data; and having means for storing in the appropriate logical device control blocks, respectively.

13. Data processing apparatus as claimed in claims 10 or 11 further including error detecting facilities effective, in the event of a detected error, to inhibit rapid discard of the corresponding page(s) of stored data were discard otherwise logically appropriate.

* * * * *